United States Patent [19]

Kitahara

[11] Patent Number: 5,247,009
[45] Date of Patent: Sep. 21, 1993

[54] RUBBER COMPOSITION CONTAINING RUBBERY POLYMER AND MODIFIED LIQUID POLYMER

[75] Inventor: Shizuo Kitahara, Kawasaki, Japan
[73] Assignee: Nippon Zeon Co., Ltd., Tokyo, Japan
[21] Appl. No.: 322,168
[22] Filed: Mar. 13, 1989
[30] Foreign Application Priority Data
Mar. 14, 1988 [JP] Japan .................................. 63-59797
[51] Int. Cl.$^5$ .............................................. C08F 8/30
[52] U.S. Cl. .................... 524/552; 525/331.7;
525/332.3; 525/332.8; 525/332.9; 525/333.6;
525/333.1; 525/333.2; 525/359.3; 525/367;
525/371; 525/374
[58] Field of Search ............... 524/237, 552, 565, 566,
524/572; 525/359.3, 367, 371, 374, 331.7, 332.8

[56] References Cited
U.S. PATENT DOCUMENTS 4,260,700  4/1981  Cassutt et al. ...................... 525/113
4,677,153  6/1987  Kitahara et al. .................. 525/359.3
4,795,778  1/1989  Bond et al. ........................... 524/551

OTHER PUBLICATIONS

Allen Greer, *Elastomers edition 2*, The International Plastics Selector Inc., 1980, pp. 84, 88.
Fredrick Eirich, *The Science and Technology of Rubber*, Academic Press, 1978, pp. 6–7.

*Primary Examiner*—John C. Bleutge
*Assistant Examiner*—Mark D. Sweet
*Attorney, Agent, or Firm*—Sherman and Shalloway

[57] ABSTRACT

A rubber composition comprising a rubbery polymer and a modified liquid polymer. The modified liquid polymer is obtained by reacting a liquid polymer having at least one carbon-carbon double bond in the molecule with an organic compound having the group —CH=N— and an organic acid halide having the group —COX where X is halogen, in the presence of a Friedel-Crafts catalyst.

18 Claims, No Drawings

RUBBER COMPOSITION CONTAINING RUBBERY POLYMER AND MODIFIED LIQUID POLYMER

This invention relates to a rubber composition comprising a rubbery polymer and a liquid polymer having a specific atomic grouping which has excellent processability and gives vulcanized products having excellent tensile properties and rebound resilience.

It has been known to add a liquid polymer covulcanizable with a rubbery polymer for the purpose of obtaining a rubber composition which has improved processability and can give vulcanizates having improved tensile properties. The resulting rubber composition, however, has the defect that vulcanizates from it have degraded dynamic properties, for example reduced rebound resilience.

It has also been known to use a rubbery polymer having introduced thereinto polar groups such as carboxyl groups for the purpose of obtaining a rubber composition capable of giving vulcanizates having improved tensile properties and rebound resilience. Since, however, side-reactions, for example the gellation of the rubber, are liable to occur at the time of modifying the rubbers, the rubber compositions obtained have degraded processability, or vulcanizates therefrom have decreased tensile strength and are difficult to use particularly in tire applications.

It is an object of this invention therefore to provide a rubber composition comprising a rubbery polymer and a liquid polymer, which has excellent processability, gives vulcanizates having excellent tensile strength, tensile stress and rebound resilience, and can be used as a tire material.

The present inventor found that a modified polymer obtained by reacting a polymer having unsaturated double bonds with a compound having the group —CH=N— and an organic acid halide in the presence of a Lewis acid gives a vulcanizate having much improved tensile strength and rebound resilience over a vulcanizate of the starting polymer (U.S. Pat. No. 4,677,153). The present inventor has now discovered that by adding a modified liquid polymer obtained by applying the above reaction to a liquid polymer having unsaturated double bonds to a rubbery polymer, a rubber composition is obtained which has excellent processability and gives vulcanizates having improved tensile strength, tensile stress and rebound resilience.

The present invention provides a rubber composition comprising a rubbery polymer and a modified liquid polymer which is obtained by reacting a liquid polymer having at least one carbon-carbon double bond in the molecule with an organic compound having a group of the formula —CH=N— and an organic acid halide having a group of the formula —COX where X is halogen, in the presence of a Friedel-Crafts catalyst.

Examples of the liquid polymer having carbon-carbon double bonds used in this invention include homopolymers of conjugated dienes such as butadiene, isoprene, piperylene, 2,3-dimethylbutadiene and chloroprene; copolymers of two or more of these conjugated dienes; copolymer rubbers (including telechelic rubbers) of at least one conjugated diene and at least one other monomer; ring-opened polymer rubbers of cycloolefins such as cyclopentene and norbornene; polymers of cyclodienes such as ethylidene norbornene and cyclopentadiene; copolymers of the above dienes and olefins, such as EPDM; and partially hydrogenated products of these polymers having unsaturated bonds. These liquid polymers have a molecular weight of about 100 to 100,000. Ordinary rubbers are excluded from these polymers.

Typical examples include polyisoprene, 1,2-polybutadiene, polybutadiene, 1,2-pentadiene polymer, polychloroprene, butadiene/acrylonitrile copolymer, butadiene/styrene copolymer, 1,2-butadiene/styrene copolymer, isoprene/styrene copolymer, isobutylene/isoprene copolymer, styrene/isoprene/styrene triblock polymer (SIS), styrene/butadiene/styrene triblock polymer (SBS), styrene/butadiene hydrogenated copolymer, styrene/isoprene hydrogenated block copolymer, petroleum resins (copolymers of $C_5$ fractions composed mainly of isoprene and 1,3-pentadiene and $C_9$ fractions composed mainly of vinyltoluene and indene), squalene, chicle and hydroxy-terminated polybutadiene.

The organic compound (to be sometimes referred to as compound I) having the group —CH=N— used in this invention is more specifically a compound represented by the following general formula

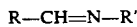

$$R-CH=N-R'$$

wherein R and R' represent an aliphatic, alicyclic or aromatic residue which may optionally have an atomic grouping such as an alkoxy, cyano, carbalkoxy, carboxyl, or dialkylamino group.

Specific examples of the above compound include benzylidenemethylamine, benzylidenebutylamine, benzylideneaniline, benzylidenecyclohexylamine, propylidenebutylamine, propylideneaniline, cyclohexylidenebutylamine, cyclohexylideneaniline, ethoxybenzylidenebutylaniline, 4-carboxylbenzylidenebutylaniline, 4-carbomethoxybenzylidenebutylamine, benzylidene-4-cyanoaniline, benzylidene4-carboxylaniline and dimethylaminobenzylidenebutylaniline.

The organic acid halide (to be sometimes referred to as compound II) having the group —COX used in the invention is more specifically a compound represented by the following general formula

$$R''-COX$$

wherein X represents halogen, and R'' represents an aliphatic, alicyclic or aromatic residue which may optionally have an atomic grouping such as an alkoxy or halocarbonyl group. Specific examples include acetyl chloride, acetyl bromide, benzoyl chloride, benzoyl bromide, carbomethoxybenzoyl chloride, oxallyl chloride, terephthaloyl chloride, acryloyl chloride and methacryloyl chloride.

The amounts of compounds I and II used are not particularly limited. Usually, the amount of each of compounds I and II is 0.001 to 30 parts by weight, preferably 0.1 to 10 parts by weight, per 100 parts by weight of the liquid polymer.

Friedel-Crafts catalyst generally known in the art, typically halogen compounds of metals or semi-metals, can be used in this invention. Examples are halogen compounds, organic halogen compounds, and complexes of elements such as Be, B, Al, Si, P, S, Ti, V, Fe, Zn, Ga, Ge, As, Se, Zr, Nb, Mo, Cd, Sn, Sb, Te, Ta, W, Hg, Bi and U or oxygen-element combinations such as PO, SeO, SO, $SO_2$ and VO. Speciic examples are $BF_3$, $BF_3O(C_2H_5)_2$, $(CH_3)AlCl_2$, $POCl_3$, $TiCl_4$, $VCl_4$, $MoCl_4$, $SnCl_4$, $WCl_6$, $(C_2H_5)_2AlCl$, $ZnCl_2$, $(C_2H_5)_3Al$ and $AgBF_4$. Of these, $SnCl_4$, $SbCl_5$, $AlCl_3$ and $TiCl_4$ are especially preferred because they induce a high rate of reaction and suppress side-reactions. The amount of the Friedel-Crafts catalyst is not particularly limited, and is usually 0.01 to 10 moles, preferably 0.05 to 3 moles per mole of compound II.

The reaction for preparing the modified liquid polymer in this invention may usually be carried out in the presence of a suitable solvent or in its absence. Industrially, the reaction is carried out advantageously in the cement left after the polymerization. Examples of the solvent are aromatic solvents such as benzene and toluene, paraffinic solvents such as butane and hexane, alicyclic solvents such as cyclohexane, and halogenated hydrocarbon-type solvents such as chloroform and dichloroethane. Those which are inert to the reaction and can dissolve the polymer are suitable.

The compounds I and II and the Friedel-Crafts catalyst may all be added in the initial stage, or portionwise or continuously during the reaction. These materials may be separately added to the reaction system, or two or three of them may be mixed before addition to the reaction system.

It is necessary that in performing the reaction, the reaction system should be kept in an anhydrous condition or below the critical water content (usually below 100 ppm). The reaction temperature is not particularly limited, and is usually $-20°$ C. to $180°$ C., preferably $-10°$ C. to $120°$ C. The reaction time is neither limited in particular, and may be 10 seconds to 10 hours.

When the reaction is carried out in a solvent, it can be completly stopped by adding a large amount of an alcohol or an alkaline aqueous solution. The various materials remaining in the polymer are washed off as required, and the residue is dried to give a modified liquid polymer.

The resulting modified liquid polymer is mixed with a rubbery polymer in proportions which will achieve the object of this invention. Examples of the rubbery polymer to be mixed with the modified liquid polymer include natural rubber (hevea), guayule rubber, synthetic polyisoprene rubber, butadiene rubber (BR hereinafter), styrene/butadiene copolymer rubber (SBR hereinafter), butadiene/piperylene copolymer rubber, butadiene/acrylonitrile copolymer rubber, isoprene/acrylonitrile copolymer rubber, high-styrene rubber, ethylene/propylene/diene copolymer rubbers (EPDM for short), butyl rubber, halogenated butyl rubber, polychloroprene rubber, ring-opened polymer rubbers of cycloolefins (e.g., cyclopentene and norbornene), polymer rubber of cyclodienes (e.g., ethylidenenorbornene and cyclopentadiene), acrylic rubber, epichlorohydrin rubber, partially hydrogenated conjugated diene polymers (e.g., partially hydrogenated butadiene/acrylonitrile rubber). These rubbers may be used in combination with each other. They may be properly selected according to the end uses of these rubbers.

The proportion of the modified liquid polymer to be blended is properly determined according to the uses of the final rubber composition. Usually, it is 1 to 70% by weight based on the total weight of the rubbery polymer and the modified liquid polymer.

The rubber composition of the invention obtained by blending the rubbery polymer and the modified liquid polymer may, as required, include ordinary rubber compounding chemicals such as vulcanizers, vulcanization accelerators, vulcanization coagents, reinforcing agents and softening agents.

There is no particular limitation on the method of mixing the rubbery polymer and the modified liquid polymer. Usually, they are mixed as solutions in a cement tank or the like, or dry-blended in various rubber kneading machines.

A rubber composition of this invention prepared by mixing 2 to 50% by weight of modified liquid polyisoprene with polyisoprene rubber or natural rubber has excellent rebound resilience, low heat buildup and high tensile stress, and is suitable for production of tire treads of large-sized trucks and buses.

A rubber composition in accordance with this invention prepared by mixing 2 to 30% by weight of a modified liquid vinyl butadiene polymer with a blend of natural rubber and BR having a bound vinyl content of 0 to 50% has excellent rebound resilience and is suitable for a tire carcass.

A rubber composition in accordance with this invention prepared by mixing 2 to 30% by weight of a modified liquid styrene/butadiene copolymer with SBR having a bound styrene content of 15 to 35% and a bound vinyl content in the butadiene portion of 0 to 50% has excellent rebound resilience and high tensile stress, and is suitable for a tire tread of an automobile.

A rubber composition in accordance with this invention prepared by mixing 2 to 50% by weight of a modified liquid styrene/butadiene/styrene triblock copolymer (SBS) or a a hydrogenation product (SBES) of a modified liquid styrene/butadiene/styrene triblock copolymer with natural rubber or an ethylene/propylene/diene copolymer rubber or a mixture of the rubber with halogenated butyl rubber (in which the proportion of the halogenated butyl rubber is not more than 50% by weight) has excellent tensile stress, rebound resilience, weatherability and fatigue resistance, and is suitably used to make a side wall, a belt, a hose and antivibration rubber.

The compositions of this invention are also useful as various ordinary rubber products, for example inner liners and undertreads of tires, footwear, rubber-coated cloths, and rubber threads of golf balls.

It has been ascertained that by the method used in this invention, compounds I and II add to the liquid polymer. This addition is believed to contribute to an improvement in the tensile stress and rebound resilience of vulcanized products obtained from the composition of this invention.

The following examples illustrate the present invention more specifically. In the following Examples and Comparative Examples, all parts and percentages are by weight unless otherwise specified. The methods of preparing the unvulcanized rubber compound containing the modified liquid polymer and its vulcanizate, and the methods of testing the properties of these products used in these examples are shown below.

Preparation of an Unvulcanizaed Rubber Compound

A rubber composition comprising the rubbery polymer and the modified liquid polymer were kneaded with various compounding chemicals shown in the recipe in each of the examples (excepting sulfur and the vulcanization accelerator) in a small-sized Banbury mixer. The resulting compound was kneaded-mixed with sulfur and the vulcanization accelerator on a small-sized roll to prepare an unvulcanized rubber compound.

Wallace Plasticity

Measured by a Wallace's rapid plastometer at 100° C.

Green Strength

The unvulcanized rubber compound was press-formed at 100° C. for 5 mintues to prepare an unvulcanized rubber sheet having a thickness of 2 mm. A dumbbell-shaped test specimen (JIS No. 3) was punched out from the sheet, and subjected to a tensile test at a pulling speed of 500 mm/min. and a temperature of 25° C. Its tensile stress at an elongation of 500% was measured.

Tensile Test

The unvulcanized rubber compound was vulcanized under pressure for a predetermined period of time at 150° C. (160° C. for the polybutadiene rubber or ethylene/propylene/diene copolymer rubber compound) to form a rubber sheet having a thickness of 2 mm. A dumbbell-shaped test specimen (No. 3 set forth in JIS-K6301) was punched out, and subjected to a tensile test at 23° C. at a pulling speed of 500 mm/min.

Rebound Resilience

The unvulcanized rubber compound was vulcanized under pressure for a predetermined period of time at 150° C. (160° C. for the polybutadiene rubber or ethylene/propylene/diene copolymer rubber compound). The rebound resilience of the resulting vulcanizate was measured at 23° C. by a Dunlop tripsometer.

EXAMPLE 1

160 g of liquid polyisoprene (cis-1,4-bond 90%, molecular weight about 10,000) was dissolved in dehydrated cyclohexane, and while the solution was stirred at 25° C. in a nitrogen atmosphere in a sealed separable glass flask, a cyclohexane solution containing 25 millimoles of benzylidenestearylamine, 25 millimoles of acetyl chloride and 25 millimoles of anhydrous tin tetrachloride was added. The mixture was reacted at 25° C. for 1 hour. Then, 100 ml of methanol was poured into the reaction mixture. The resulting half-coagulated polymer was poured into acetone/methanol, and the resulting polymer was separated from the reaction solvent, immersed in methanol containing 5 g of 2,6-di-t-butyl-4-methylphenol as an antioxidant, and dried for one day in a vacuum desiccator to give modified liquid polyisoprene.

The modified liquid polyisoprene was added to the rubbery polymers indicated in Table 1 in the proportions indicated to give sample rubbers A, B, C and D.

TABLE 1

| Sample rubber | Rubbery polymer | Modified liquid polymer | Proportion of the modified liquid polymer (%) |
|---|---|---|---|
| A | natural rubber (RSS #3) | modified liquid polyisoprene | 10 |
| B | natural rubber (RSS #3) | modified liquid polyisoprene | 20 |
| C | polyisoprene rubber (cis-1,4 bond 98%) | modified liquid polyisoprene | 10 |
| D | polyisoprene rubber (cis-1,4 bond 98%) | modified liquid polyisoprene | 20 |

Rubber compounds were prepared in accordance with the following compounding recipe using the sample rubbers shown in Table 2, and the properties of the resulting compounds were tested. The results are shown in Table 2.

| Compounding Recipe (parts) | |
|---|---|
| Sample rubber | 100 |
| HAF carbon | 50 |
| Aromatic oil | 5 |
| Zinc oxide | 5 |
| Stearic acid | 2 |
| Sulfur | 2.5 |
| N-oxydiethylene-2-benzothiazyl sulfenamide | 0.8 |
| N-isopropyl-N'-phenyl-p-phenylenediamine | 1.0 |

TABLE 2

| | Sample rubber | Vulcanized compound Green strength (kg/cm²) | Vulcanization time (min.) | 300% Tensile stress (kg/cm²) | Tensile strength (kg/cm²) | Elongation (%) | Rebound resilience (%) |
|---|---|---|---|---|---|---|---|
| Invention | A | 18.6 | 21 | 171 | 280 | 490 | 66 |
| | B | 17.1 | 21 | 160 | 275 | 500 | 64 |
| | C | 3.4 | 23 | 153 | 277 | 520 | 66 |
| | D | 2.3 | 23 | 133 | 275 | 540 | 64 |
| Comparison | natural rubber | 17.6 | 20 | 163 | 285 | 510 | 63 |
| | polyisoprene rubber | 2.1 | 22 | 130 | 280 | 570 | 62 |
| | natural rubber + liquid polyisoprene (10%) | 14.3 | 21 | 142 | 280 | 550 | 61 |
| | isoprene rubber + liquid polyisoprene (10%) | 1.8 | 23 | 121 | 276 | 575 | 60 |

It is seen from Table 2 that in runs according to the invention, green strength and rebound resilience were improved over comparative runs. The compositions including the liquid polymers had much better processability on rolls than the comparative composition containing the rubbery polymer alone.

EXAMPLE 2

160 g of liquid polybutadiene (cis-1,4 bond 98%, molecular weight 3000 to 8000) was dissolved in 1.5 liters of dehydrated benzene, and a benzene solution containing 20 millimoles of benzylidenebutylamine, 20 millimoles of acetyl chloride and 20 millimoles of titanium tetrachloride was added to the solution in a nitrogen atmosphere in a sealed separable glass flask. They were reacted at 25° C. for 1 hour, and 100 ml of methanol was added to stop the reaction. The reaction mixture was then poured into 2 liters of a 2% methanol solution of 2,6-di-t-butyl-4-methylphenol as an antioxidant. The polymer was separated from the reaction solvent, washed with methanol containng the antioxidant, and dried for one day in a vacuum desiccator to give modified liquid polybutadiene.

The resulting modified liquid polymer was added to the rubbery polymers indicated in Table 3 in the proportions indicated to give sample rubbers E, F and G.

TABLE 3

| Sample rubber | Rubbery polymer | Modified liquid polymer | Proportion of the modified liquid polymer (%) |
|---|---|---|---|
| E | cispolyisoprene rubber | modified liquid polybutadiene | 15 |
| F | cispolyisoprene rubber | modified liquid polybutadiene | 15 |
| G | vinylpolybutadiene rubber | modified liquid polybutadiene | 15 |

Rubber compounds were prepared in accordance with the following recipes using the sample rubbers shown in Table 4, and the properties of the rubber compounds were tested. The results are shown in Table 4.

| Compound recipe (parts) | | | |
|---|---|---|---|
| cis-Polyisoprene rubber or a mixture of it with a liquid polymer | 100 | | |
| cis-Polybutadiene rubber or a mixture of it with a liquid polymer | | 100 | |
| Vinylpolybutadiene rubber or a mixure of it with a liquid polymer | | | 100 |
| HAF carbon | 50 | 50 | 50 |
| Aromatic oil | 5 | 5 | 5 |
| Zinc oxide | 5 | 3 | 3 |
| Stearic acid | 2 | 2 | 2 |
| Sulfur | 2.5 | 1.5 | 1.0 |
| N-oxydiethylene-2-benzothiazyl sulfenamide | 0.8 | 1.1 | 2.0 |
| N-isopropyl-N'-phenyl-p-phenylenediamine | 1.0 | 1.0 | 1.0 | rubber alone can be obtained and processability on rolls is markedly improved.

EXAMPLE 3

160 g of styrene/butadiene/styrene triblock copolymer (SBS, molecular weight 10000) was dissolved in 1 g of dehydrated cyclohexane, and a cyclohexane solution containing 20 millimoles of benzylidenestearylamine, 20 millimoles of acetyl chloride and 20 millimoles of tin tetrachloride was added to the solution at 25° C. in a nitrogen atmosphere. The mixture was reacted for 60 minutes, and then the reaction was stopped by adding 100 ml of methanol. The reaction mixture was poured into 2 liters of acetone/methanol, and the polymer was separated from the reaction solvent. The separated polymer was washed by immersing it in 1 liter of methanol containing about 2 g of 2,6-t-butyl-4-methylphenol as an antioxidant, and dried for one day in a vacuum desiccator to give modified liquid SBS.

Sample rubbers H and I were prepared by adding the resulting modified liquid polymer to EPDM as indicated in Table 5.

TABLE 5

| Sample rubber | Rubbery polymer | Modified liquid polymer | Proportion of the modified liquid polymer (%) |
|---|---|---|---|
| H | ethylene/propylene/ ethylidenenorbornene copolymer rubber (EPDM) | modified liquid SBS | 20 |
| I | ethylene/propylene/ ethylidenenorbornene copolymer rubber (EPDM) | modified liquid SBS | 30 |

Rubber compounds were prepared in accordance with the following compounding recipe using the sample rubbers shown in Table 6, and the properties of vulcanizates obtained from the compounds were measured. The results are shown in Table 6.

| Compounding recipe (parts) | |
|---|---|
| Sample rubber | 100 |
| HAF carbon | 67.5 |

TABLE 4

| | Sample rubber | Vulcanized compound Green strength (kg/cm²) | Vulcanization time (min.) | 300% Tensile stress (kg/cm²) | Tensile strength (kg/cm²) | Elongation (%) | Rebound resilience (%) |
|---|---|---|---|---|---|---|---|
| Invention | E | 2.2 | 22 | 130 | 275 | 520 | 60 |
| | F | 0.9 | 16 | 110 | 203 | 430 | 53 |
| | G | 1.2 | 25 | 130 | 155 | 330 | 43 |
| Comparison | cis-polybutadiene rubber | 0.8 | 15 | 103 | 193 | 450 | 52 |
| | vinylpolybutadiene rubber | 1.2 | 25 | 124 | 168 | 370 | 42 |
| | cis-polybutadiene rubber + liquid polybutadiene (15%) | 0.6 | 17 | 98 | 184 | 480 | 50 |
| | cis-polyisoprene rubber + liquid polybutadiene (15%) | 1.7 | 23 | 119 | 270 | 580 | 56 |
| | vinylpolybutadiene rubber + liquid polybutadiene (15%) | 1.0 | 25 | 116 | 158 | 380 | 41 |

Table 4 shows that the sample rubbers E to G in accordance with this invention have better strength and rebound resilience than the comparative samples containing the unmodified liquid polymers, and that by replacing 15 of rubber by the modified liquid polymer, properties equivalent to, or better than, those of the

| Aromatic oil | 35 |
|---|---|
| Zinc oxide | 5 |
| Stearic acid | 1 |
| Sulfur | 1.5 |
| Tetramethylthiouram monosulfide | 1.5 |

| Compounding recipe (parts) | |
|---|---|
| 2-Mercaptobenzothiazole | 0.5 |

TABLE 6

| | | Vulcanizate | | | | |
|---|---|---|---|---|---|---|
| | Sample rubber | Vulcanization time (min.) | 300% Tensile stress (kg/cm²) | Tensile strength (kg/cm²) | Elongation (%) | Rebound resilience (%) |
| Invention | H | 16 | 158 | 191 | 320 | 53 |
| | I | 17 | 147 | 183 | 330 | 52 |
| Comparison | EPDM | 16 | 144 | 189 | 380 | 50 |
| | EPDM + SBS (30%) | 17 | 123 | 163 | 360 | 46 |

Table 6 shows that sample rubbers H and I in accordance with this invention have better strength and rebound resilience than the comparative samples.

What is claimed is:

1. A rubber composition comprising a rubbery polymer and a modified liquid polymer which is obtained by reacting a liquid polymer having at least one carboncarbon double bond in the molecule with an organic compound having a group of the formula —CH=N— and an organic acid halide having a group of the formula —COX where X is halogen, in the presence of a Friedel-Crafts catalyst.

2. The rubber composition of claim 1 in which the liquid polymer having at least one carbon-carbon double bond in the molecule is selected from the group consisting of homopolymers of conjugated dienes, copolymers of at least two conjugated dienes, copolymers of at least one conjugated diene and at least one other monomer, ring-opened polymers of cycloolefins, polymers of cyclodienes, and polymers resulting from partial hydrogenation of the carbon-carbon double bonds in these polymers.

3. The rubber composition of claim 1 in which the Friedel-Crafts catalyst is a halogen compound of a metal or semi-metal.

4. The rubber composition of claim 1 in which the organic compound is represented by the general formula

R—CH=N—R' wherein R and R', independently from each other, represent an aliphatic, alicyclic or aromatic residue.

5. The rubber composition of claim 1 in which the organic compound and the organic acid halide are used each in an amount of 0.001 to 30 parts by weight per 100 parts by weight of the liquid polymer.

6. The rubber composition of claim 1 in which the rubbery polymer is selected from the group consisting of natural rubber, conjugated diene polymer rubbers, EPDM, ring-opened polymers of cycloolefins, cyclodiene polymers, acrylic rubber, epichlorohydrin rubbers and partially hydrogenated conjugated diene polymer rubbers.

7. The rubber composition of claim 1 in which the content of the modified liquid polymer is 1 to 70% by weight based on the total weight of the rubbery polymer and the modified liquid polymer.

8. The rubber composition of claim 2 wherein the liquid polymer has a molecular weight of from about 100 to 100,000.

9. The rubber composition of claim 1 in which the liquid polymer has a molecular weight of from about 100 to 100,000.

10. The rubber composition of claim 9 wherein the liquid polymer is selected from the group consisting of polyisoprene, 1,2-polybutadiene, 1,2-pentadiene polymer, polychloroprene, butadiene/acrylonitrile copolymer, butadiene/styrene copolymer, 1,2-butadiene/styrene copolymer, isoprene/styrene copolymer, isobutylene/isoprene copolymer, styrene/isoprene/styrene triblock polymer, styrene/butadiene/styrene triblock polymer, styrene/butadiene hydrogenated copolymer, styrene/isoprene hydrogenated block copolymer, petroleum resins, squalene, chicle and hydroxy-terminated polybutadiene.

11. The rubber composition of claim 1 wherein the organic compound is selected from the group consisting of benzylidenemethylamine, benzylidenebutylamine, benzylidenestearylamine, benzylideneaniline, benzylidenecyclohexylamine, propylidenebutylamine, propylideneaniline,, cyclohexylidenebutylamine, cyclohexylideneaniline, ethoxybenzylidenebutylaniline, 4-carboxylbenzylidenebutylaniline, 4-carbomethoxybenzylidenebutylamine, benzylidene-4-cyanoaniline, benzylidene-4-carboxylaniline and dimethylaminobenzylidenebutylaniline.

12. The rubber composition of claim 1 wherein the organic acid halide is selected from the group consisting of acetyl chloride, acetyl bromide, benzoyl chloride, benzoyl bromide, carbomethoxybenzoyl chloride, oxallyl chloride, terephthaloyl choride, acryloyl chloride and methacryloyl chloride.

13. The rubber composition of claim 1 in which the organic compound and the organic acid halide are used each in an amount of 0.1 to 10 parts by weight, per 100 parts by weight of the liquid polymer.

14. The rubber composition of claim 13 wherein the Friedel-Crafts catalyst is used in an amount of from 0.01 to 10 moles, per mole of the organic acid halide.

15. The rubber composition of claim 1 in which the rubbery polymer is polyisoprene rubber or natural rubber and the liquid polymer is polyisoprene, said rubber composition being obtained by mixing 2 to 50% by weight of the modified liquid polyisoprene with the rubbery polymer.

16. The rubber composition of claim 1 in which the liquid polymer is a vinyl butadiene polymer and the rubbery polymer is a blend of natural rubber and butadiene rubber having a bound vinyl content of from 0 to 50%, said rubber composition being obtained by mixing 2 to 30% by weight of the modified liquid vinyl butadiene polymer with the rubbery polymer blend.

17. The rubber composition of claim 1 wherein the liquid polymer is a styrene/butadiene copolymer and the rubbery polymer is a styrene/butadiene rubber having a bound styrene content of 15 to 35% and a bound vinyl content in the butadiene portion of 0 to 50%, said rubber composition being prepared by mixing 2 to 30% by weight of the modified liquid styrene/butadiene copolymer with the rubbery polymer.

18. The rubber composition of claim 1 wherein the liquid polymer is a styrene/butadiene/styrene triblock copolymer or a hydrogenation product thereof and the rubbery polymer is natural rubber or an ethylene/propylene/diene copolymer rubber or a mixture of either of said rubbers with halogenated butyl rubber, in which the proportion of the halogenated butyl rubber is not more than 50% by weight of the rubbery polymer, and wherein said rubber composition is prepared by mixing 2 to 50% by weight of the modified liquid polymer with the rubbery polymer.

* * * * *